United States Patent
Kaji et al.

(10) Patent No.: US 9,972,409 B2
(45) Date of Patent: May 15, 2018

(54) INSULATED WIRE

(71) Applicants: DENSO CORPORATION, Aichi (JP); UNIMAC LTD., Mie (JP)

(72) Inventors: Takefumi Kaji, Nagoya (JP); Shinsuke Sugiura, Nishio (JP); Kazuomi Hirai, Inabe (JP); Yumi Nakane, Inabe (JP); Tatsumi Hirano, Inabe (JP); Yasunari Ashida, Inabe (JP)

(73) Assignees: DENSO Corporation, Aichi (JP); Unimac Ltd., Mie (JP)

( * ) Notice: Subject to any disclaimer, the term of this patent is extended or adjusted under 35 U.S.C. 154(b) by 238 days.

(21) Appl. No.: 14/852,019

(22) Filed: Sep. 11, 2015

(65) Prior Publication Data
US 2016/0086691 A1  Mar. 24, 2016

(30) Foreign Application Priority Data

Sep. 18, 2014 (JP) ................. 2014-190288

(51) Int. Cl.
*H01B 1/02* (2006.01)
*H01B 3/30* (2006.01)
*H01B 7/02* (2006.01)

(52) U.S. Cl.
CPC ............ *H01B 1/023* (2013.01); *H01B 3/306* (2013.01)

(58) Field of Classification Search
CPC .... H01B 1/023; H01B 3/306; C08G 73/1007; C08G 73/1067; C08J 5/18; C08J 2379/08; C08L 79/08; C09D 179/08; Y10T 428/12569; Y10T 428/31681; Y10T 428/31721

USPC ................... 428/35, 473.5, 458; 174/110 R; 528/176, 183, 185
See application file for complete search history.

(56) References Cited

U.S. PATENT DOCUMENTS

| | | | |
|---|---|---|---|
| 2008/0070016 A1* | 3/2008 | Hwang | B32B 15/08 428/213 |
| 2013/0098656 A1* | 4/2013 | Saito | C09D 179/08 174/110 SR |
| 2014/0065421 A1 | 3/2014 | Ushiwata et al. | |

FOREIGN PATENT DOCUMENTS

| | | |
|---|---|---|
| CN | 103680697 A | 3/2014 |
| JP | 5405696 B1 | 11/2013 |
| JP | 2014049377 A | 3/2014 |
| TW | 201504368 A | 2/2015 |
| WO | WO2014/141322 A1 | 9/2014 |

* cited by examiner

*Primary Examiner* — Lee E Sanderson
*Assistant Examiner* — Michael C Romanowski
(74) *Attorney, Agent, or Firm* — Harness, Dickey & Pierce, P.L.C.

(57) ABSTRACT

According to one embodiment, an insulated wire is disclosed. The insulated wire includes an aluminum conductor, and a first insulating film provided on the aluminum conductor. The first insulating film is made of a first polyimide obtained by reacting an acid component containing 50 mol % to 90 mol % of 3,3',4,4'-biphenyl tetracarboxylic acid dianhydride, 5 mol % to 20 mol % of 3,3',4,4'-benzophenone tetracarboxylic acid dianhydride, and 5 mol % to 40 mol % of pyromellitic anhydride with a diamine component containing 4,4'-diaminodiphenyl ether.

7 Claims, 1 Drawing Sheet

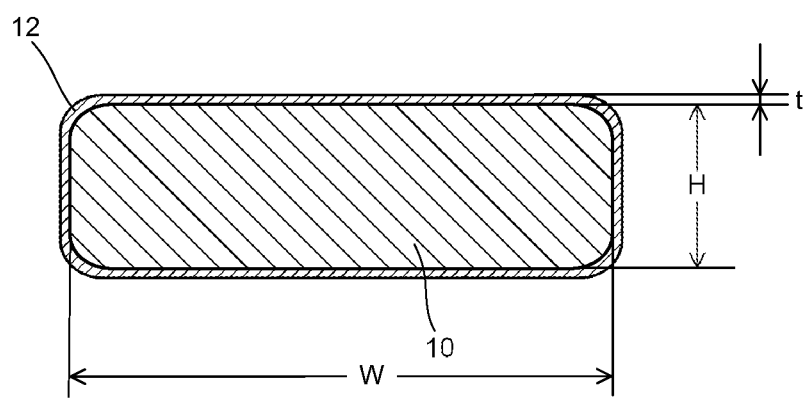

INSULATED WIRE

CROSS-REFERENCE TO RELATED APPLICATIONS

This application is based upon and claims the benefit of priority from the prior Japanese Patent Application No. 2014-190288, filed on Sep. 18, 2014; the entire contents of which are incorporated herein by reference.

FIELD

Embodiments described herein relate generally to an insulated wire used for forming a coil of a motor and the like.

BACKGROUND

In recent years, electronic devices and electric devices have been miniaturized, and accordingly, as coils attached inside such devices, those using an enameled wire with a rectangular cross section (rectangular enameled wire) are coming into use mainly in place of those using a conventional enameled wire with a circular cross section (round enameled wire). An insulating varnish is applied onto a conductor with a rectangular cross section (rectangular conductor) and then baked to form an insulating film on the rectangular enameled wire. The use of the rectangular enameled wire can reduce a gap between the enameled wires when the enameled wire is wound around a coil (that is, a space factor of the enameled wire can be heightened), and enables miniaturization of the coil. There has recently been an increasing demand for a rectangular enameled wire using, as its conductor, aluminum that is lightweight in place of copper that is conventionally used in order to achieve a weight reduction of the coil.

Aluminum, however, is oxidized in the air in an instant and thus an oxide film is formed on a surface of the aluminum conductor. Further, since aluminum is lower in melting point than copper, temperature when the insulating varnish is baked is limited. For these reasons and so on, the enameled wire using the aluminum conductor has had problems of poorer adhesion between the conductor and the insulating film and deterioration of processing resistance, as compared with an enameled wire using a copper conductor. Recent attention has been drawn to a polyimide-based resin varnish used as an insulating film material due to lower adhesion and processing resistance, in view of its low dielectric constant.

SUMMARY

An object of the present invention is to provide an insulated wire including, on an aluminum conductor, an insulating film that is made of a polyimide resin and has an excellent adhesion.

According to one aspect of the present invention, there is provided an insulated wire including an aluminum conductor, and a first insulating film provided on the aluminum conductor. The first insulating film is made of a first polyimide obtained by reacting an acid component containing 50 mol % to 90 mol % of 3,3',4,4'-biphenyl tetracarboxylic acid dianhydride, 5 mol % to 20 mol % of 3,3',4,4'-benzophenone tetracarboxylic acid dianhydride, and 5 mol % to 40 mol % of pyromellitic anhydride with a diamine component containing 4,4'-diaminodiphenyl ether.

BRIEF DESCRIPTION OF THE DRAWINGS

FIG. 1 is a cross-sectional view illustrating an insulated wire according to an embodiment.

DETAILED DESCRIPTION

According to an embodiment of the present invention, there is provided an insulated wire including, on an aluminum conductor, an insulating film that is made of a polyimide resin and has an excellent adhesion.

Hereinafter, embodiments of the present invention will be described. The description will be given based on the drawings, but the drawings are provided only for the purpose of illustration, and the present invention is not limited in any way by the drawings.

FIG. 1 is a transverse cross-sectional view illustrating a rectangular enameled wire according to an embodiment of the insulated wire in the present invention.

As illustrated in FIG. 1, the rectangular enameled wire includes a rectangular conductor 10 with a rectangular cross section formed by wire drawing, and an insulating film (first insulating film) 12 formed on the rectangular conductor 10.

The rectangular conductor 10 has the rectangular cross section of, for example, 2.0 mm to 7.0 mm in width (W) and 0.7 mm to 3.0 mm in thickness (H). The rectangular conductor 10 is formed of an aluminum wire made of aluminum or an aluminum alloy. A surface of the aluminum wire may be coated with another metal. Examples of a material used for the coating are tin, zinc, nickel, silver, copper, and so on. Further, the surface of the aluminum wire may apply a surface treatment such as corona treatment. In this specification, an aluminum wire including the above aluminum wire whose surface is coated and/or surface-treated will be referred to as "aluminum wire" unless otherwise specified. Further, the "rectangular conductor" formed of such "aluminum wire" will be referred to as "rectangular aluminum conductor" unless otherwise specified.

Four corner portions in the rectangular cross section of the rectangular aluminum conductor 10 may be chamfered or not. In view of heightening the space factor when the rectangular aluminum conductor 10 is wound around a coil, it is preferable that the four corner portions are not chamfered (that is, the cross section thereof is rectangular), or even when the four corner portions are chamfered, the radius of the chamfering is 0.4 mm or less.

The first insulating film 12 is a layer made of polyimide obtained by reacting an acid component containing 50 mol % to 90 mol % of 3,3',4,4'-biphenyl tetracarboxylic acid dianhydride (BPDA), 5 mol % to 20 mol % of 3,3',4,4'-benzophenone tetracarboxylic acid dianhydride (BTDA), and 5 mol % to 40 mol % of pyromellitic anhydride (PMDA) with a diamine component containing 4,4'-diaminodiphenyl ether (DDE). The first insulating film 12 is formed by applying a polyimide resin varnish containing such polyimide on the rectangular aluminum conductor 10 and then baking the polyimide resin varnish.

Hereinafter, the polyimide resin varnish used for forming the first insulating film 12 will be described.

3,3',4,4'-biphenyl tetracarboxylic acid dianhydride, 3,3',4,4'-benzophenone tetracarboxylic acid dianhydride, and pyromellitic anhydride are used as the acid component of the polyimide resin varnish uses. Ratios of these components relative to the whole acid component are as follows. The ratio of 3,3',4,4'-biphenyl tetracarboxylic acid dianhydride is 50 mol % to 90 mol %, the ratio of 3,3',4,4'-benzophenone tetracarboxylic acid dianhydride is 5 mol % to 20 mol %, and the ratio of pyromellitic anhydride is 5 mol % to 40 mol %. When the ratios are within these ranges, it is possible to impart excellent environmental atmosphere resistance and processing resistance to the first insulating film 12. The ratios of the components relative to the whole acid component are preferably 60 mol % to 70 mol % of 3,3',4,4'-biphenyl tetracarboxylic acid dianhydride, 10 mol % to 15 mol % of 3,3',4,4'-benzophenone tetracarboxylic acid dianhydride, and 25 mol % to 30 mol % of pyromellitic anhydride.

Further, as the diamine component to react with the above acid component, 4,4'-diaminodiphenyl ether is used. A ratio of 4,4'-diaminodiphenyl ether relative to the whole diamine component is preferably 80 mol % or more, and is more preferably 90 mol % or more. As the diamine component, it is especially preferable to use 4,4'-diaminodiphenyl ether solely.

When another diamine component is used in combination with 4,4'-diaminodiphenyl ether, it is preferable to use aromatic diamine such as m-phenylenediamine, p-phenylenediamine, 2,4-diaminotoluene, 4,4'-diamino-3,3'-dimethyl-1,1'-biphenyl, 4,4'-diamino-3,3'-dihydroxy-1,1'-biphenyl, 3,4'-diaminodiphenyl ether, 4,4'-diaminodiphenyl ether, 3,3'-diaminodiphenylsulfone, 4,4'-diaminodiphenylsulfone, 4,4'-diaminodiphenylsulfide, 2,2-bis(4-aminophenyl)propane, 2,2-bis(4-aminophenyl)hexafluoropropane, 1,3-bis(4-aminophenoxy)benzene, 1,4-bis(4-aminophenoxy)benzene, 4,4'-bis(4-aminophenoxy)biphenyl, 2,2-bis[4-(4-aminophenoxy)phenyl]propane, 2,2-bis[4-(4-aminophenoxy)phenyl]hexafluoropropane, bis[4-(3-aminophenoxy)phenyl]sulfone, or bis[4-(4-aminophenoxy)phenyl]sulfone.

Examples of a solvent that reacts the acid component with the diamine component include aprotic polar solvents such as 2-pyrrolidone, N-methyl-2-pyrrolidone (NMP), and N,N-dimethylacetamide, and phenolic solvents such as phenol, cresol, and xylenol.

When the acid component and the diamine component are reacted with each other, a reactive catalyst such as amines, imidazoles, or imidazolines may be used. The reactive catalyst is preferably one that does not hinder stability of the polyimide resin varnish.

The polyimide forming the first insulating film 12 has a glass transition point (Tg) of preferably 250° C. to 350° C., and more preferably 260° C. to 290° C. When the glass transition point (Tg) is lower than 250° C., the first insulating film 12 is liable to deform under a high-temperature environment, and when the glass transition point (Tg) is higher than 350° C., the adhesion of the first insulating film 12 to the rectangular aluminum conductor 10 is liable to deteriorate.

The first insulating film 12 is formed by applying the polyimide resin varnish on the rectangular aluminum conductor 10 and then baking the polyimide resin varnish. A method of applying and baking the polyimide resin varnish is not particularly limited, and a conventionally and generally known method is usable, such as, for example, a method in which the rectangular aluminum conductor 10 is passed through a tank storing the polyimide resin varnish and thereafter the polyimide resin varnish is baked in a baking furnace.

A thickness (t) of the first insulating film 12 is not particularly limited, and may be appropriately set according to an intended use and the like. When the thickness of the first insulating film 12 is less than 10 μm, the electric insulation is liable to be insufficient. When the thickness of the first insulating film 12 is greater than 200 μm, the first insulating film 12 is too thick, leading to a difficulty in miniaturizing the coil. Therefore, the thickness of the first insulating film 12 is preferably 10 μm to 200 μm. Further, in order to easily achieve the miniaturization of the coil while ensuring excellent electric insulation, the thickness of the first insulating film 12 is preferably 40 μm to 160 μm.

The rectangular enameled wire of the embodiment includes, on the rectangular aluminum conductor 10, the first insulating film 12 made of the polyimide obtained by reacting the acid component containing 50 mol % to 90 mol % of 3,3',4,4'-biphenyl tetracarboxylic acid dianhydride, 5 mol % to 20 mol % of 3,3',4,4'-benzophenone tetracarboxylic acid dianhydride, and 5 mol % to 40 mol % of pyromellitic anhydride with the diamine component containing 4,4'-diaminodiphenyl ether. The first insulating film 12 is excellent in adhesion to the rectangular aluminum conductor 10, and the excellent adhesion of the first insulating film 12 is maintained even after the first insulating film 12 is thermally degraded. Therefore, the rectangular enameled wire can include, on the rectangular aluminum conductor, the insulating film that is made of the polyimide and has the excellent adhesion.

Further, the first insulating film 12 has excellent insulating properties, electric properties, heat resistance, mechanical strength, and so on, that are intrinsic to polyimide. Therefore, the rectangular enameled wire can include the insulating film excellent in insulating properties, electric properties, heat resistance, mechanical strength, and so on.

In the embodiment, one other insulating film or more, though not illustrated, may be further provided on the first insulating film 12 as required. For example, a second insulating film made of a second polyimide different from the first polyimide can be provided on the first insulating film 12 for the purpose of improving the heat resistance and the processing resistance. The second polyimide to be used is not limited, provided that it is one conventionally used in the application of this type. A concrete example of the second polyimide includes polyimide having a repeating unit represented by, for example, the following formula (1).

[Chem. 1]

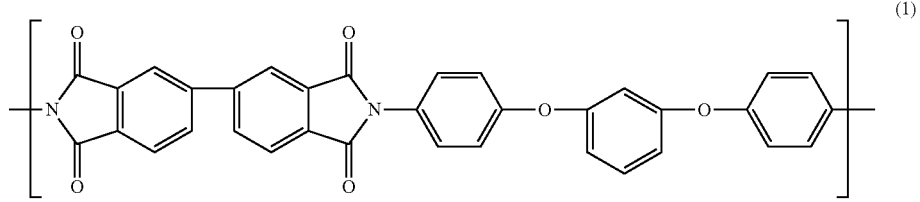

(1)

The material of the other insulating film is not limited to the above polyimide, and polyamide-imide, polyesterimide, or the like is usable. In view of heat resistance and a partial discharge property, polyimide is preferable.

When the other insulating film is provided, a thickness of the other insulating film is preferably set so that the total thickness of the first insulating film 12 and the other insulating film falls within a range of 15 μm to 200 μm. When the total thickness is less than 15 μm, adhesion lowers, and when the total thickness is greater than 200 μm, it is difficult to miniaturize the coil.

As mentioned above, the embodiment according to the present invention and its modification examples have been described, but the present invention is not limited to the above-described embodiment in its entirety, and in an implementation stage, it can be embodied, with the constituent elements being modified without departing from its spirit. For example, the above-described embodiment is an example in which the present invention is applied to the rectangular enameled wire, but it goes without saying that the present invention is also applicable to a round enameled wire using an ordinary round conductor and so on.

The insulated wire of the above-described embodiment can include the insulating film having the excellent properties such as the insulating property and the heat resistance that are intrinsic to polyimide in addition to having the excellent adhesion to the aluminum conductor. Therefore, the insulated wire of the above-described embodiment is widely usable as a coil material of a motor, a power generator, a reactor, a transformer, and so on as a substitute for a conventional insulated wire including an insulating film made of polyimide on a copper conductor, and can realize a weight reduction of these devices.

EXAMPLES

Hereinafter, the present invention will be more concretely described by means of examples, but the present invention is not limited in any way to these examples. Note that Examples 3 to 7, 12, 13, 16 to 21 are the examples and the other Examples are comparative examples. In the following description, the term "parts" means "parts by mass" unless otherwise specified.

[Preparation of Polyimide Resin Varnish]

Preparation Example 1

0.40 mol of 3,3',4,4'-biphenyl tetracarboxylic acid dianhydride (BPDA), 0.15 mol of 3,3',4,4'-benzophenone tetracarboxylic acid dianhydride (BTDA) and 0.45 mol of pyromellitic anhydride (PMDA) as an acid component, and 1.02 mol of 4,4'-diaminodiphenyl ether (DDE) as a diamine component were put into a flask that was provided with a stirrer, a nitrogen inlet pipe and a heating and cooling system. As a solvent, 400 parts of N-methyl-2-pyrrolidone were put into the flask with respect to total 100 parts of the acid and diamine components. After they were reacted for two hours while being stirred under a nitrogen atmosphere, a polyimide resin varnish (W-1) whose resin content was 20 mass % was obtained.

Preparation Examples 2 to 12

Polyimide resin varnishes (W-2) to (W-11) were obtained in the same manner as that in Preparation Example 1 except that the ratios of the acid component were changed as shown in Table 1. As a polyimide resin varnish (W-12), a polyimide resin varnish (Torayneece #3000 produced by Toray Industries, Inc.) which is a polyimide resin varnish for industrial use was used.

TABLE 1

| | | | Polyimide Resin Varnish | | | | | | | | | | | |
|---|---|---|---|---|---|---|---|---|---|---|---|---|---|---|
| | | | W-1 | W-2 | W-3 | W-4 | W-5 | W-6 | W-7 | W-8 | W-9 | W-10 | W-11 | W-12 |
| Composition | Acid Component (mol) | BPDA | 0.40 | 0.40 | 0.75 | 0.60 | 0.60 | 0.70 | 0.90 | 0.90 | 0.80 | 0.90 | 0.40 | Torayneece #300 |
| | | BTDA | 0.15 | 0.30 | 0.20 | 0.08 | 0.15 | 0.10 | 0.05 | — | 0.20 | 0.10 | — | |
| | | PMDA | 0.45 | 0.30 | 0.05 | 0.32 | 0.25 | 0.20 | 0.05 | 0.10 | — | — | 0.60 | |
| | Diamine Component (mol) | DDE | 1.02 | 1.02 | 1.02 | 1.02 | 1.02 | 1.02 | 1.02 | 1.02 | 1.02 | 1.02 | 1.02 | |

[Production and Evaluation of Insulated Wires]

Example 1

The polyimide resin varnish (W-1) shown in Table 1 was applied on a rectangular aluminum conductor with 1.9 mm in thickness and 3.0 mm in width and then baked to form a film (first insulating film) with 100 μm in thickness, so that an insulated wire was obtained.

Examples 2 to 11, 14 to 15

Insulated wires were obtained in the same manner as that in Example 1 except that at least one condition out of the kind of the rectangular conductor and the kind of the polyimide resin varnish used for forming the first insulating film was changed as shown in Tables 2 to 3.

Examples 12 to 13

The polyimide resin varnish (W-5) shown in Table 1 was applied on rectangular aluminum conductors each with 1.9 mm in thickness and 3.0 mm in width and then baked to form films (first insulating films). The polyimide resin varnish (W-12) shown in Table 1 was applied on these films and then baked to form films (second insulating films), so that insulated wires each including a film with 100 μm in thickness that is the total thickness of the first insulating film and the second insulating film were obtained.

With regard to each of the obtained insulated wires in Examples 1 to 15, various properties were measured and evaluated by the following methods.

[Glass Transition Point (Tg)]

Glass transition points (Tg) of the materials forming the respective films (the first insulating films and the second insulating films) were measured by using a thermomechanical analyzer.

[Adhesion]

A 180° peeling test between the insulating film and the conductor was conducted, and the adhesion strength (unit: g/mm) of each of the insulating films was measured.

[Processing Resistance]

Insulated wire samples each 25 cm in length were extended by 30%, an edgewise bending test was conducted on them, and they were evaluated by the following criteria (n=40).

A: no crack occurs
B: crack occurrence rate is less than 5%
C: crack occurrence rate is 5% or more and less than 10%
D: crack occurrence rate is 10% or more The measurement results are shown in Tables 2 to 3 together with constitutions, dimensions, and so on of the respective insulated wires. Note that the numeric values in the parentheses of Tables 2 to 3 each indicate a component ratio (unit: %) of the insulating film.

TABLE 2

|  |  |  | Example 1 | Example 2 | Example 3 | Example 4 | Example 5 | Example 6 | Example 7 | Example 8 |
|---|---|---|---|---|---|---|---|---|---|---|
| Constitution/Dimension | Constitution | Conductor | Aluminum | Aluminum | Aluminum | Aluminum | Aluminum | Aluminum | Aluminum | Aluminum |
|  |  | First Insulating Film | W-1 | W-2 | W-3 | W-4 | W-5 | W-6 | W-7 | W-8 |
|  |  | Second Insulating Film | — | — | — | — | — | — | — | — |
|  | Conductor Dimension (mm) | Thickness | 1.9 | 1.9 | 1.9 | 1.9 | 1.9 | 1.9 | 1.9 | 1.9 |
|  |  | Width | 3.0 | 3.0 | 3.0 | 3.0 | 3.0 | 3.0 | 3.0 | 3.0 |
|  | Thickness of Insulating Film (μm) | Total Thickness | 100 | 100 | 100 | 100 | 100 | 100 | 100 | 100 |
|  |  | First Insulating Film | 100 (100) | 100 (100) | 100 (100) | 100 (100) | 100 (100) | 100 (100) | 100 (100) | 100 (100) |
|  |  | Second Insulating Film | — | — | — | — | — | — | — | — |
| Properties | Glass Transition Point Tg (° C.) | First Insulating Film | 380 | 360 | 350 | 290 | 280 | 260 | 250 | 240 |
|  |  | Second Insulating Film | — | — | — | — | — | — | — | — |
|  | Adhesion (g/mm) |  | 20 | 50 | 53 | 58 | 61 | 63 | 72 | 70 |
|  | Processing Resistance |  | D | D | B | A | A | A | B | D |

TABLE 3

|  |  |  | Example 9 | Example 10 | Example 11 | Example 12 | Example 13 | Example 14 | Example 15 |
|---|---|---|---|---|---|---|---|---|---|
| Constitution/Dimension | Constitution | Conductor | Aluminum | Aluminum | Aluminum | Aluminum | Aluminum | Aluminum | Copper |
|  |  | First Insulating Film | W-9 | W-10 | W-11 | W-5 | W-5 | W-12 | W-12 |
|  |  | Second Insulating Film | — | — | — | W-12 | W-12 | — | — |
|  | Conductor Dimension (mm) | Thickness | 1.9 | 1.9 | 1.9 | 1.9 | 1.9 | 1.9 | 1.9 |
|  |  | Width | 3.0 | 3.0 | 3.0 | 3.0 | 3.0 | 3.0 | 3.0 |
|  | Thickness of Insulating Film (μm) | Total Thickness | 100 | 100 | 100 | 100 | 100 | 100 | 100 |
|  |  | First Insulating Film | 100 (100) | 100 (100) | 100 (100) | 15 (15) | 50 (50) | 100 (100) | 100 (100) |
|  |  | Second Insulating Film | — | — | — | 85 (85) | 50 (50) | — | — |
| Properties | Glass Transition Point Tg (° C.) | First Insulating Film | 380 | 370 | 360 | 265 | 265 | 400 | 400 |
|  |  | Second Insulating Film | — | — | — | 400 | 400 | — | — |
|  | Adhesion (g/mm) |  | 20 | 30 | 50 | 46 | 57 | 3 | 15 |
|  | Processing Resistance |  | D | D | D | A | A | D | A |

As is apparent from Tables 2 to 3, in the insulated wires of Examples 3 to 7, 12, 13 (examples), the adhesion between the rectangular aluminum conductor and the insulating film was excellent, and the result of the evaluation test of the processing resistance was also excellent.

Examples 16 to 21

Insulated wires were obtained in the same manner as that in Example 4 except that the thickness of the first insulating film was changed as shown in Table 4.

With regard to each of the obtained insulated wires in Examples 16 to 21, "glass transition point (Tg)", "adhesion", and "processing resistance" were measured and evaluated by the above methods, and further "electric insulation" and "easiness of miniaturizing the coil" were evaluated by the following methods. The evaluation results are shown in Table 4 together with constitutions, dimensions, and so on of the respective insulated wires. In Table 4, the results obtained when the insulated wire of Example 4 was similarly evaluated are also shown. Note that the numeric values in the parentheses of Table 4 each indicate a component ratio (unit: %) of the insulating film.

[Electric Insulation]

Insulation resistance breakdown voltage was measured, and the evaluation was made by the following criteria.

A: insulation resistance breakdown voltage is 10 kV or more

B: insulation resistance breakdown voltage is 5 kV or more and less than 10 kV

C: insulation resistance breakdown voltage is less than 5 kV

[Easiness of Miniaturizing the Coil]

Based on the thickness of the insulating film, the evaluation was made by the following criteria.

A: very easy

B: easy

C: difficult

TABLE 4

| | | | Example 4 | Example 16 | Example 17 | Example 18 | Example 19 | Example 20 | Example 21 |
|---|---|---|---|---|---|---|---|---|---|
| Constitution/ Dimension | Constitution | Conductor | Aluminum | Aluminum | Aluminum | Aluminum | Aluminum | Aluminum | Aluminum |
| | | First Insulating Film | W-4 | W-4 | W-4 | W-4 | W-4 | W-4 | W-4 |
| | | Second Insulating Film | — | — | — | — | — | — | — |
| | Conductor Dimension (mm) | Thickness | 1.9 | 1.9 | 1.9 | 1.9 | 1.9 | 1.9 | 1.9 |
| | | Width | 3.0 | 3.0 | 3.0 | 3.0 | 3.0 | 3.0 | 3.0 |
| | Thickness of Insulating Film (μm) | Total Thickness | 100 | 5 | 10 | 40 | 160 | 200 | 205 |
| | | First Insulating Film | 100 (100) | 5 (100) | 10 (100) | 40 (100) | 160 (100) | 200 (100) | 205 (100) |
| | | Second Insulating Film | — | — | — | — | — | — | — |
| Properties | Electric Insulation | | A | C | B | A | A | A | A |
| | Easiness of Miniaturizing the Coil | | A | A | A | A | A | B | C |
| | Glass Transition Point Tg (° C.) | First Insulating Film | 290 | 290 | 290 | 290 | 290 | 290 | 290 |
| | | Second Insulating Film | — | — | — | — | — | — | — |
| | Adhesion (g/mm) | | 58 | 58 | 58 | 58 | 58 | 58 | 58 |
| | Processing Resistance | | A | A | A | A | A | A | A |

It is seen from Table 4 that the electric insulation is insufficient (C) when the thickness of the first insulating film is less than 10 μm (for example, 5 μm in Table 4). Further, it is seen from Table 4 that the miniaturization of the coil is difficult (C) when the thickness of the first insulating film is greater than 200 μm (for example, 205 μm in Table 4) as compared with a case where the thickness of the first insulating film is 200 μm or less. Therefore, it can be said based on Table 4 that the thickness of the first insulating film is preferably 10 μm to 200 μm. It can also be said that the thickness of the first insulating film is more preferably 40 μm to 160 μm in order to easily achieve the miniaturization of the coil while ensuring the excellent electric insulation.

The insulated wire of the above-described embodiment includes the insulating film that is made of the polyimide and has the excellent adhesion to the rectangular aluminum conductor. Thus the insulated wire is suitable as an insulated wire used for forming coils in various applications such as a coil for an automobile motor.

What is claimed is:

1. An insulated wire, comprising:
   an aluminum conductor; and
   a first insulating film, wherein said first insulating film is in contact with said aluminum conductor, the first insulating film consisting essentially of a first polyimide obtained by reacting an acid component with a diamine component, the acid component consisting essentially of, with respect to 100 mol % of the acid component:

60 mol % to 70 mol % of 3,3',4,4'-biphenyl tetracarboxylic dianhydride (BPDA), 10 mol % to 15 mol % of 3,3',4,4'-benzophenone tetracarboxylic dianhydride (BTDA), and 25 mol % to 30 mol % of pyromellitic dianhydride (PMDA), and the diamine component consisting essentially of 90 mol % or greater of 4,4-diaminodiphenyl ether.

2. The insulated wire according to claim 1, wherein the first polyimide has a glass transition point ($T_g$) of 250° C. to 350° C.

3. The insulated wire according to claim 1, wherein the first insulating film has a thickness of 10 μm to 200 μm.

4. The insulated wire according to claim 1, further comprising a second insulating film provided on the first insulating film, the second insulating film being made of a second polyimide.

5. The insulated wire according to claim 1, wherein the conductor is a rectangular conductor.

6. The insulated wire according to claim 5, wherein the rectangular conductor has a rectangular cross section of 2.0 mm to 7.0 mm in width and 0.7 mm to 3.0 mm in thickness.

7. The insulated wire according to claim 1, wherein the acid component consists of 60 mol % BPDA, 15 mol % BTDA and 25 mol % PMDA.

* * * * *